P. OKERLUND.
Fifth-Wheel for Vehicles.

No. 198,809. Patented Jan. 1, 1878.

Witnesses
Jno. L. Boone
Geo. H. Strong.

Inventor
Peter Okerlund
by Dewey & Co
his Attys.

UNITED STATES PATENT OFFICE.

PETER OKERLUND, OF SAN FRANCISCO, CALIFORNIA.

IMPROVEMENT IN FIFTH-WHEELS FOR VEHICLES.

Specification forming part of Letters Patent No. 198,809, dated January 1, 1878; application filed November 21, 1877.

*To all whom it may concern:*

Be it known that I, PETER OKERLUND, of the city and county of San Francisco, and State of California, have invented a Fifth-Wheel for Vehicles; and I do hereby declare the following description and accompanying drawings are sufficient to enable any person skilled in the art or science to which it most nearly appertains to make and use my said invention without further invention or experiment.

My invention relates to a novel construction of fifth-wheels for wagons and carriages; and it consists in the construction and combination of parts, as hereinafter fully described, for connecting the axle and the bolster and the two parts of the wheel without the use of a king-bolt, and thus obviates the necessity of a hole through the bolster, axle, and axle-bed, as is required when the parts are connected by a king-bolt, in the ordinary manner.

My invention will be more fully described in connection with the accompanying drawings, in which—

Figure 1:
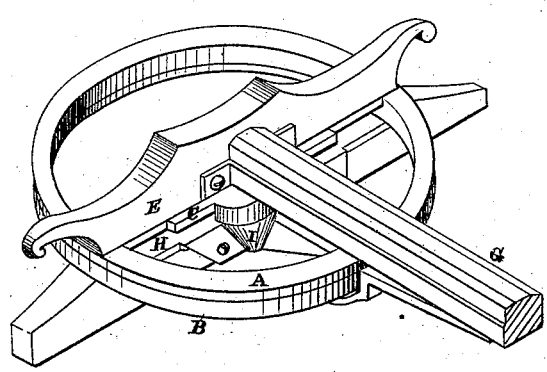
Figure 2:
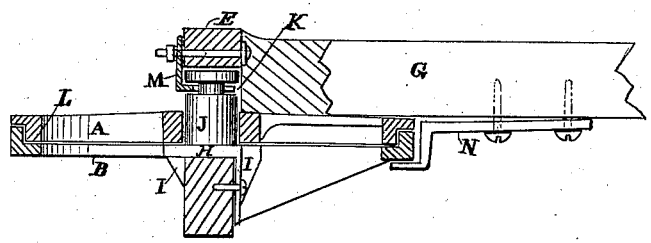
Figure 3:
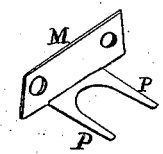

Figure 1 is a perspective view, Fig. 2 a vertical section, and Fig. 3 a plan.

Letters A and B represent the upper and lower halves of my fifth-wheel. The upper half, A, I form with a cross-piece, C, in the middle of which is an enlargement, through which I make a hole or socket, D. The spring-bolster E is screwed or bolted to the cross-piece C, and a radial arm, F, extends from the center of the wheel at right angles to the cross-piece C, so as to form a support and attachment for the reach G. The half-wheel A, with its cross-piece C, and the radial arm F, are all cast in one piece, so as to be as strong as possible. The lower half, B, of the wheel is also formed with a cross-piece, H, having downward-projecting flanges I, between which the axle-bed rests and is secured. A radial arm is also formed on this lower half, which serves to strengthen the wheels.

In the middle of the cross-piece H is formed a short upward-projecting pin or stem, J, with a groove or slot, K, in its circumference near its end. The lower half, B, with its arm and cross-piece, is also cast in one piece. The upper half, A, of the wheel has a rim or flange, L, on its periphery, which fits in a corresponding depression in the lower half, B.

When the two parts of the wheel are brought together, the stem J enters the hole or socket D, and its end projects through the hole, so that the groove K will be above the cross-piece on the half A.

The bolster F is cut away at its middle, to allow space for the projecting stem J, and a key, M, enters the space in the stem formed by the slot K, and is secured to the bolster. This key M is formed of a metallic plate, O, with two projecting spurs or arms, P, bent at right angles to the plate. The plate is bolted to the bolster, and the arms or spurs enter the bolster, and fit into the slot or neck K on the stem J, holding it securely, and at the same time allowing the stem and the two parts of the wheel to turn freely on each other. The two parts of the wheel are thus secured together, and are also held together and in place by a bar, N, on the under side of the reach, and outside of the wheel.

By constructing a fifth-wheel without a king-bolt or a central hole the weakness and liability to break at that point is overcome, and by my invention a fifth-wheel is constructed which is strongly made at every point, and is so simply constructed and easy working as to form a cheap and in every way desirable fifth-wheel.

Having thus described my invention, what I claim, and desire to secure by Letters Patent, is—

1. A fifth-wheel constructed without a king-bolt, consisting of the two parts of a wheel, A and B, with their cross-pieces C and H, central hole D, stem J, with its slot K and key M, and bar N, all combined, constructed, and arranged substantially as and for the purposes above described.

2. The circular parts A and B of a fifth-wheel, with their cross-pieces and radial arms, socket or hole D, stem J, and with a rim or flange, L, on the periphery of one of the parts, and a corresponding depression in that of the other, all constructed and arranged substantially as and for the purposes above described.

3. The key M, consisting of a plate, O, and projecting spurs or arms P, for holding the two parts of the wheel securely together, constructed and arranged substantially as and for the purposes herein described.

In witness whereof I have hereunto set my hand and seal.

PETER OKERLUND. [L. S.]

Witnesses:
   GEO. H. STRONG,
   FRANK A. BROOKS.